(12) United States Patent
Kapanowski et al.

(10) Patent No.: US 10,457,265 B2
(45) Date of Patent: Oct. 29, 2019

(54) METHODS AND APPARATUS TO FACILITATE BRAKE BLEEDING

(71) Applicant: Ford Global Technologies, LLC, Dearborn, MI (US)

(72) Inventors: Martin Christopher Kapanowski, Dexter, MI (US); Brad J. Johnson, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 192 days.

(21) Appl. No.: 15/454,743

(22) Filed: Mar. 9, 2017

(65) Prior Publication Data

US 2018/0257630 A1 Sep. 13, 2018

(51) Int. Cl.
*B60T 17/22* (2006.01)
(52) U.S. Cl.
CPC .................... *B60T 17/222* (2013.01)
(58) Field of Classification Search
CPC ............................ B60T 17/22; B60T 17/222
USPC ........................................................ 303/122
See application file for complete search history.

(56) References Cited

U.S. PATENT DOCUMENTS

| | | | |
|---|---|---|---|
| 3,559,405 A | | 2/1971 | Neilson |
| 4,188,074 A | * | 2/1980 | Yama .................... B60T 8/4225 188/352 |
| 4,703,979 A | * | 11/1987 | Nakanishi ............. B60T 8/4291 188/181 A |
| 8,215,343 B2 | * | 7/2012 | Murphy ................. B60T 17/222 141/192 |
| 8,464,763 B2 | * | 6/2013 | Petty ..................... B60T 17/222 141/65 |
| 8,911,030 B2 | | 12/2014 | Ohnishi et al. |
| 2003/0159440 A1 | * | 8/2003 | Lavezzi .................. B60T 11/30 60/584 |
| 2004/0251740 A1 | * | 12/2004 | Schmidt .................... B60T 8/34 303/191 |
| 2005/0109421 A1 | * | 5/2005 | Mitchell ............... B60T 17/222 141/59 |
| 2005/0279091 A1 | * | 12/2005 | Smith ................... B60T 17/222 60/584 |
| 2006/0131952 A1 | * | 6/2006 | Richardson ........... F16D 65/853 303/10 |
| 2006/0138861 A1 | * | 6/2006 | Buschmann ............. B60T 8/34 303/122.08 |
| 2006/0192426 A1 | * | 8/2006 | Baechle .................... B60T 8/34 303/119.1 |

(Continued)

FOREIGN PATENT DOCUMENTS

JP S63121560 5/1988

*Primary Examiner* — Bradley T King
*Assistant Examiner* — Mahbubur Rashid
(74) *Attorney, Agent, or Firm* — Ray Coppiellie; Hanley, Flight & Zimmerman, LLC

(57) ABSTRACT

Example methods, apparatus, systems and articles of manufacture are disclosed to facilitate brake bleeding. Example apparatus disclosed herein include a bleed controller to actuate a first valve connected to a pump and an end of a brake line, the pump connected to a reservoir; to actuate a second valve connected to the pump and a master cylinder, the master cylinder connected to the reservoir; and to operate the pump to bleed the brake line when the first valve is actuated and to bleed the master cylinder when the second valve is actuated.

21 Claims, 12 Drawing Sheets

(56) References Cited

U.S. PATENT DOCUMENTS

| | | | |
|---|---|---|---|
| 2007/0095422 A1* | 5/2007 | Petty | B60T 17/222 |
| | | | 141/98 |
| 2007/0175539 A1* | 8/2007 | Flournoy | B60T 17/222 |
| | | | 141/98 |
| 2009/0032347 A1* | 2/2009 | Murphy | B60T 17/222 |
| | | | 188/352 |
| 2010/0096576 A1* | 4/2010 | Sommer | B60T 11/30 |
| | | | 251/129.15 |
| 2013/0256071 A1 | 10/2013 | Jones et al. | |
| 2013/0333376 A1* | 12/2013 | Murayama | B60T 7/042 |
| | | | 60/545 |
| 2015/0136551 A1 | 5/2015 | Jones et al. | |
| 2016/0046274 A1* | 2/2016 | Matsuura | B60T 17/22 |
| | | | 701/34.4 |

* cited by examiner

METHODS AND APPARATUS TO FACILITATE BRAKE BLEEDING

FIELD OF THE DISCLOSURE

This disclosure relates generally to automobiles and, more particularly, to methods and apparatus to facilitate brake bleeding.

BACKGROUND

Automobiles are typically equipped with hydraulic braking systems. In such systems, hydraulic brake fluid actuates a brake to stop the automobile. In these systems, air may become trapped in the braking system to form bubbles in the hydraulic brake fluid. To reliably produce adequate braking pressure, the hydraulic brake fluid is moved through the braking system during maintenance of the automobile to remove air bubbles.

Figure 1:
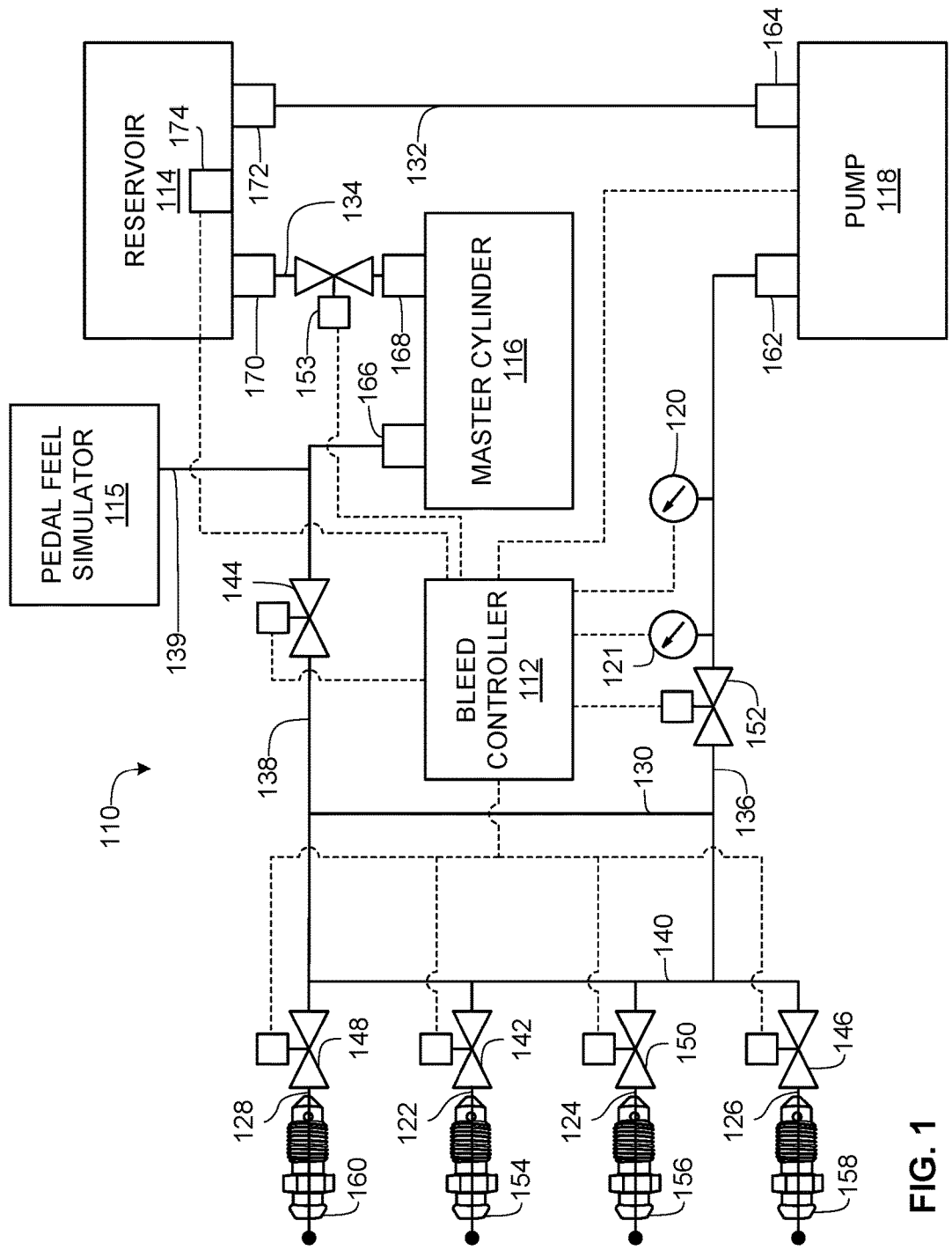
FIG. 1 is a schematic illustration of an example hydraulic braking system implemented with an example bleed controller described herein.

The figures are not to scale. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

In general, the example bleed controller described herein may be used with hydraulic braking systems having a pump (e.g., included in an electronic brake booster (EBB)) to remove air (e.g., entrapped bubbles and/or dissolved gases) from hydraulic fluid in components (e.g., tubing, pipes, master cylinder, pedal feel simulator, calipers, etc.) of the braking system (e.g., bleed the braking system). The example bleed controller described herein provides significantly increased efficiency in brake bleeding procedures and reduces wasted hydraulic brake fluid, compared to at least some known brake bleeding procedures. Thus, the example bleed controller described herein may advantageously be used in the manufacture and/or maintenance of automobiles, aircraft, rotating equipment, etc. equipped with hydraulic braking systems.

The example bleed controller described herein communicates with valves, a sensor, and a pump of an example hydraulic braking system. In some examples, one or more of the valves, the sensor, and the pump are included in an EBB. Under normal operation, the pump augments (e.g., boosts) braking pressure in the hydraulic braking system when an operator (e.g., driver) applies pressure to the master cylinder of the hydraulic braking system to, for example, stop a vehicle (e.g., the pump provides braking assistance for the operator). During maintenance of the hydraulic braking system according to an example brake bleeding procedure implemented using the example bleed controller described herein, the bleed controller configures (e.g., actuates) the valves and operates the pump substantially continuously to selectively move brake fluid and trapped air through the master cylinder and/or lines of the hydraulic braking system to remove the air from the brake fluid. Additionally, during maintenance of the hydraulic braking system according to the example brake bleeding procedure implemented using the example bleed controller described herein, the bleed controller monitors brake fluid pressure and/or displaced volume to coordinate bleeding of the master cylinder and/or the lines and to generate alerts (e.g., warnings), for example, when the brake fluid pressure and/or the displaced volume of brake fluid exceeds a respective threshold. As used herein, the terms "threshold" and "thresholds" refer to upper limits, lower limits, and/or intermediary limits. As used herein, the terms "bleed" and "bled" refer to processes by which hydraulic brake fluid is moved through lines and components of a hydraulic brake system to remove air. It should be understood that, in some examples, hydraulic brake fluid need not be removed (e.g., flushed) from a hydraulic brake system to remove air from the hydraulic brake system.

FIG. 1 is a schematic illustration of an example hydraulic braking system 110 implemented with an example bleed controller 112 described herein. The example hydraulic braking system 110 further includes a reservoir 114, a pedal feel simulator 115, a master cylinder 116, a pump 118, a first sensor 120, a second sensor 121, a first brake line 122, a second brake line 124, a third brake line 126, a fourth brake line 128, a bypass line 130, a pump fluid supply line 132, a master cylinder fluid supply line 134, a pump pressure line 136, a master cylinder pressure line 138, a pedal feel simulator line 139, a pressure bridge line 140, a first valve 142, a second valve 144, a third valve 146, a fourth valve 148, a fifth valve 150, a sixth valve 152, a seventh valve 153, a first bleed screw 154, a second bleed screw 156, a third bleed screw 158, and a fourth bleed screw 160. The pump 118 may be any type of pump (e.g., vane, gear, centrifugal, peristaltic, progressing cavity, piston, lobe, single-acting, double-acting, etc.). The first sensor 120 may sense fluid pressure. The second sensor 121 may sense fluid flow (e.g., rate, volume, etc.). The first sensor 120 and/or the second sensor 121 may also sense one or more of fluid temperature, and/or fluid density. As used herein, the terms "line" and "lines" refer to any fluid-conveying structure (e.g., pipes, hoses, tubes, drilled ports, machined passages, cast conduit architectures, etc.).

In some examples, one or more of the pedal feel simulator 115, the master cylinder 116, the pump 118, the first sensor 120, the second sensor 121, the bypass line 130, the pump pressure line 136, the master cylinder pressure line 138, the pedal feel simulator line 139, the pressure bridge line 140, and the first, second, third, fourth, fifth, sixth, and seventh valves 142, 144, 146, 148, 150, 152, 153 are included (e.g., packaged, housed, assembled together, etc.) in an EBB.

The first, second, third, and fourth bleed screws 154, 156, 158, 160 are respectively included in first, second, third, and fourth brake assemblies (e.g., calipers) (not pictured in FIG. 1), for example, respectively located at front left, front right, rear left, and rear right corners of an automobile.

The pump 118 includes a first port 162 and a second port 164. The master cylinder 116 includes a third port 166 and a fourth port 168. The reservoir 114 includes a fifth port 170 and a sixth port 172, and a third sensor 174. The third sensor 174 senses a brake fluid level in the reservoir 114.

The pump fluid supply line 132 fluidly connects the sixth port 172 of the reservoir 114 to the second port 164 of the pump 118. The master cylinder fluid supply line 134 fluidly connects the fifth port 170 of the reservoir 114 to the fourth port 168 of the master cylinder 116. The pedal feel simulator line 139 connects the pedal feel simulator 115 to the master cylinder pressure line 138. The pressure bridge line 140 fluidly interconnects the first, second, third, and fourth brake lines 122, 124, 126, 128. The pump pressure line 136 fluidly connects the first port 162 of the pump 118 and the pressure bridge line 140. The master cylinder pressure line 138 fluidly connects the third port 166 of the master cylinder 116 and the pressure bridge line 140. The bypass line 130 fluidly connects the pump pressure line 136 and the master cylinder pressure line 138 to bypass the pressure bridge line 140.

The first valve 142, the fifth valve 150, the third valve 146, and the fourth valve 148 are respectively located on (e.g., along) and control brake fluid flow through the first, second, third, and fourth brake lines 122, 124, 126, 128. The second valve 144 is located on and controls brake fluid flow through the master cylinder pressure line 138. The sixth valve 152 is located on and controls brake fluid flow through the pump pressure line 136. The seventh valve 153 is located on and controls brake fluid flow through the master cylinder fluid supply line 134. The first sensor 120 is located on and measures brake fluid pressure in the pump pressure line 136. The second sensor 121 is located on and measures brake fluid flow in the pump pressure line 136

The first, second, third, fourth, fifth, sixth, and seventh valves 142, 144, 146, 148, 150, 152, 153 are electrically-actuated (e.g., solenoid) valves. The bleed controller 112 is in electrical communication with the pump 118, the first sensor 120, the second sensor 121, the first, second, third, fourth, fifth, sixth, and seventh valves 142, 144, 146, 148, 150, 152, 153 and the third sensor 174 (as denoted by dashed lines). In some examples, the bleed controller 112 is included in a vehicle computer. Additionally or alternatively, the bleed controller 112 is included in the EBB.

Figure 2:
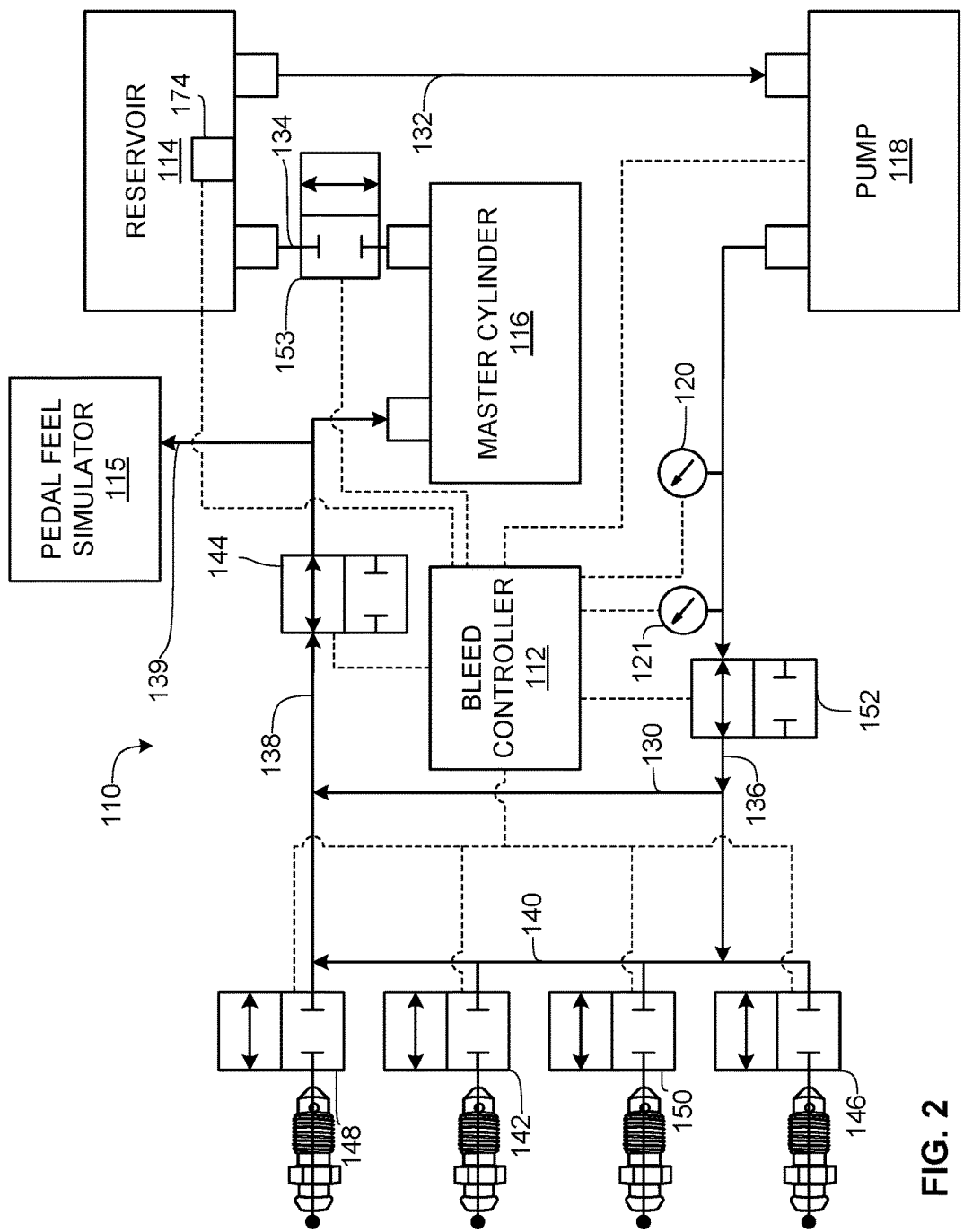
FIG. 2 is a schematic illustration of the example hydraulic braking system implemented with the example bleed controller FIG. 1 in operation to bleed the example pedal feel simulator.

FIG. 2 is a schematic illustration of the example hydraulic braking system 110 implemented with the example bleed controller 112 of FIG. 1 in operation to bleed the example pedal feel simulator. To enter a brake bleed mode (e.g., for a vehicle undergoing hydraulic braking system maintenance), the bleed controller 112 is accessed (e.g., by an operator, a vehicle maintenance technician, etc.) via on-board vehicle controls (e.g., an infotainment system, buttons, etc.), via a sequence of sensed vehicle component actuations (e.g., pedal depressions, steering wheel turns, door openings and closings, lamp illuminations and extinguishments, turn signal commands, etc.), and/or via an external on-board diagnostics (OBD) tool. In some examples, the operator communicates (e.g., receives prompts, receives information, inputs commands, inputs information, etc.) with the bleed controller 112 via the on-board vehicle controls, vehicle components, and/or the external OBD tool.

In the illustrated example of FIG. 2, in operation, the bleed controller 112 actuates the first, second, third, fourth, fifth, sixth, and seventh valves 142, 144, 146, 148, 150, 152, 153 to open the second and sixth valves 144, 152 (as denoted by double arrowed lines) and to close the first, third, fourth, fifth, and seventh valves 142, 146, 148, 150, 153 (as denoted by opposing "T" shaped line ends). The bleed controller 112 operates the pump 118 to pulse (e.g., in sinusoidal pattern) brake fluid from the reservoir 114 into the pedal feel simulator and the master cylinder 116 via pump fluid supply line 132, the pump pressure line 136, the bypass line 130, the pressure bridge line 140, the master cylinder pressure line 138, and the master cylinder fluid supply line 134 (as denoted by single arrowed lines). As the brake fluid pulses, air trapped in the pedal feel simulator 115 is shaken free to float out of the pedal feel simulator 115 into the master cylinder 116 via the pedal feel simulator line 139. In other words, the bleed controller 112 cycles the pump 118 to intermittently pressurize brake fluid in the pedal feel simulator 115, where any air entrained with the brake fluid rises out of the brake fluid, leaving clean (e.g., free of air) brake fluid in the pedal feel simulator 115.

In operation, the bleed controller 112 monitors the internal pressure of the hydraulic braking system 110 via the first sensor 120 while operating the pump 118 to pressurize brake fluid in the pedal feel simulator 115. If the internal pressure exceeds a threshold, the bleed controller 112 generates an alert (e.g., a warning), ceases operating the pump 118, and/or aborts the brake bleed mode. The alert may be implemented via the vehicle undergoing hydraulic braking system 110 maintenance as a horn chirp, flashing lights, a dashboard display, an audio message, etc.

Figure 3:
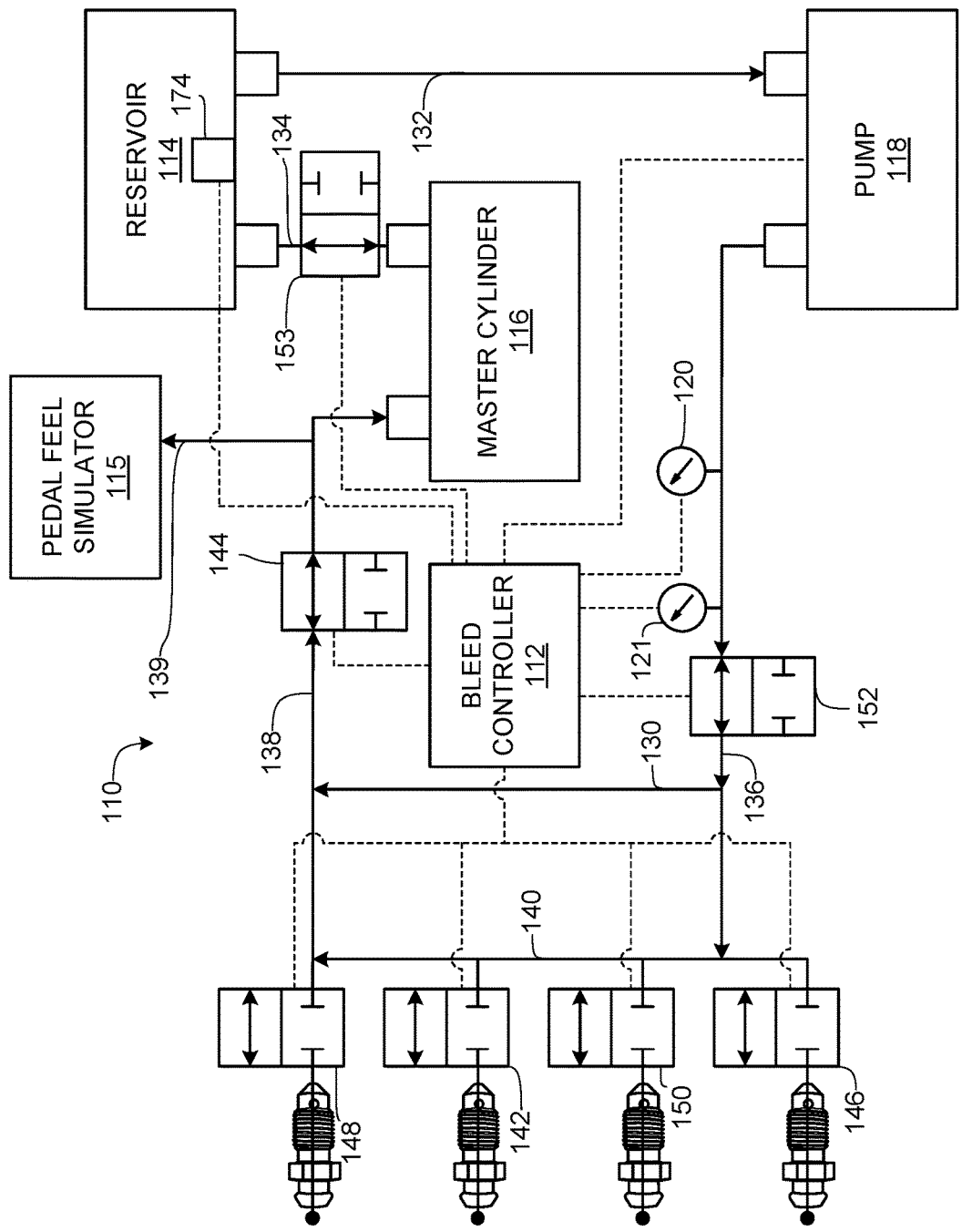
FIG. 3 is a schematic illustration of the example hydraulic braking system implemented with the example bleed controller FIG. 1 in operation to bleed the example master cylinder.

FIG. 3 is a schematic illustration of the example hydraulic braking system 110 implemented with the example bleed controller 112 of FIG. 1 in operation to bleed the example master cylinder 116.

In the illustrated example of FIG. 3, in operation, the bleed controller 112 actuates the first, second, third, fourth, fifth, sixth, and seventh valves 142, 144, 146, 148, 150, 152, 153 to open the second, sixth, and seventh valves 144, 152, 153 (as denoted by double arrowed lines) and to close the first, third, fourth, and fifth valves 142, 146, 148, 150 (as denoted by opposing "T" shaped line ends). The bleed controller 112 operates the pump 118 to circulate brake fluid from the reservoir 114 through the master cylinder 116 via pump fluid supply line 132, the pump pressure line 136, the bypass line 130, the pressure bridge line 140, the master cylinder pressure line 138, and the master cylinder fluid supply line 134 (as denoted by single arrowed lines). As the brake fluid circulates, air trapped in the master cylinder 116, the pump pressure line 136, the bypass line 130, the pressure bridge line 140, the master cylinder pressure line 138, and/or the master cylinder fluid supply line 134 is pushed into the reservoir 114, where the air floats out of the brake fluid. In other words, the bleed controller 112 cycles the pump 118 to move brake fluid from the reservoir 114 through the master cylinder 116 and back into the reservoir 114, where any air entrained with the returned brake fluid rises out of the brake fluid, leaving clean (e.g., free of air) brake fluid in the reservoir 114, the master cylinder 116, the pump 118, the pump pressure line 136, the bypass line 130, the pressure bridge line 140, the master cylinder pressure line 138, the master cylinder fluid supply line 134, and the pump fluid supply line 132.

In operation, the bleed controller 112 monitors the internal pressure of the hydraulic braking system 110 via the first sensor 120 while operating the pump 118 to circulate brake fluid through the master cylinder 116 and the reservoir 114. If the internal pressure exceeds a threshold, the bleed controller 112 generates an alert, ceases operating the pump 118, and/or aborts the brake bleed mode. In operation, the bleed controller 112 monitors the volume of circulated brake fluid via the pump 118 and/or the second sensor 121. When monitoring volume via the pump 118, the bleed controller 112 senses and/or counts a number of actuation cycles of the pump 118 (e.g., operation cycles, revolutions, etc.) and, based on an internal volume of the pump 118, determines a volume of pumped brake fluid. The number of actuation cycles may be based on a position (e.g., stroke, depth, angle, etc.) of internal components of the pump 118 (e.g., a piston, a screw, a gear, a vane, etc.) sensed by a fourth sensor connected or internal to the pump 118 (not shown in FIG. 3). The bleed controller 112 may cease operating the pump 118 to circulate brake fluid through the master cylinder 116 and the reservoir 114 based on when the number of actuation cycles exceeds a count threshold, when the volume of circulated brake fluid exceeds a volume threshold, and/or an elapsed time.

Figure 4:
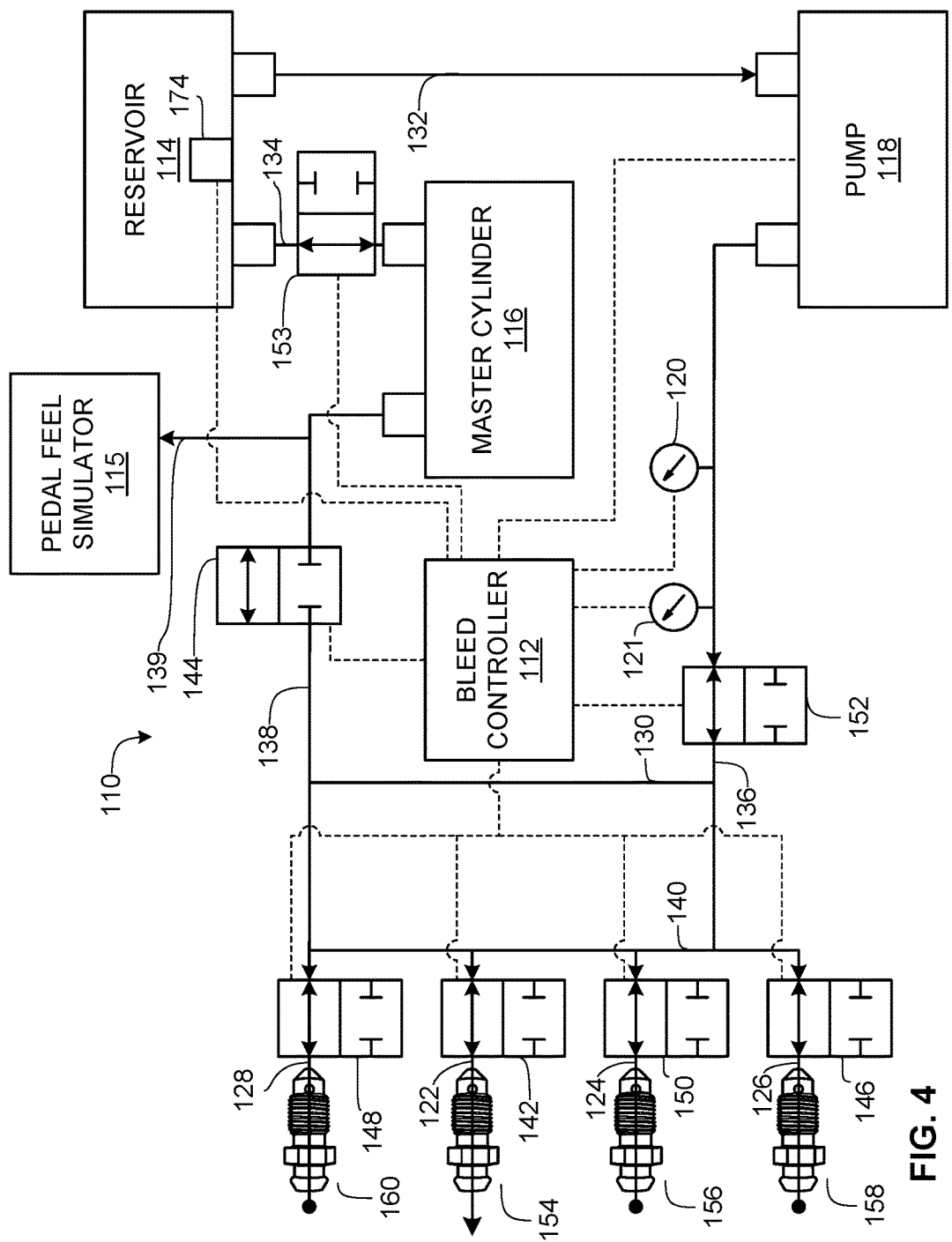
FIG. 4 is a schematic illustration of the example hydraulic braking system implemented with the example bleed controller FIG. 1 in operation to bleed the example first brake line.

FIG. 4 is a schematic illustration of the example hydraulic braking system 110 implemented with the example bleed controller 112 of FIG. 1 in operation to bleed the example first brake line 122. In the illustrated example of FIG. 4, in operation, the bleed controller 112 actuates the first, second, third, fourth, fifth, and sixth valves 142, 144, 146, 148, 150, 152 to open the first, third, fourth, fifth, and sixth valves 142, 146, 148, 150, 152 (as denoted by double arrowed lines) and to close the second valve 144 (as denoted by opposing "T" shaped line ends). In the illustrated example of FIG. 4, the second, third, and fourth bleed screws 156, 158, 160 are closed (as denoted by closed dot-ended lines). In the illustrated example of FIG. 4, the first bleed screw 154, is opened (as denoted by a single arrowed line), for example, by an operator (e.g., a vehicle maintenance technician).

The bleed controller 112 operates the pump 118 to pressurize (e.g., to maintain a substantially constant brake fluid pressure) brake fluid from the reservoir 114 in the pump pressure line 136, the bypass line 130, the pressure bridge line 140, and the first, second, third, and fourth brake lines 122, 124, 126, 128. In the illustrated example of FIG. 4, because the first bleed screw 154 is open, brake fluid and entrained air are released from the first brake line 122, the pressure bridge line 140, the bypass line 130, and the pump pressure line 136.

In further operation, the first bleed screw 154 is closed and the second, third, and fourth bleed screws 156, 158, 160 are successively opened and closed (e.g., by an operator) while the bleed controller 112 operates the pump 118 to respectively release brake fluid and entrained air from the second, third, and fourth brake lines 124, 126, 128. In operation, the bleed controller 112 monitors the internal pressure of the hydraulic braking system 110 via the first sensor 120 and intermittently operates the pump 118 to maintain the pressure within a range (e.g., above a first threshold and/or below a second threshold) while the first, second, third, and fourth bleed screws 154, 156, 158, 160 are successively opened and closed. In operation, the bleed controller 112 monitors a volume of brake fluid in the reservoir 114 (e.g., a brake fluid level) via the third sensor 174 while the first, second, third, and fourth bleed screws 154, 156, 158, 160 are successively opened and closed. The bleed controller 112 monitors the number of actuation cycles of the pump 118 and the volume of pumped brake fluid via the second sensor 121 and/or the pump 118 (as described above with respect to FIG. 3) while the first, second, third, and fourth bleed screws 154, 156, 158, 160 are successively opened and closed. In some examples, the bleed controller 112 counts the number of actuation cycles after the third sensor 174 senses a low brake fluid level in the reservoir 114. In some examples, the bleed controller 112 generates alerts to prompt an operator to successively open and close the first, second, third, and fourth bleed screws 154, 156, 158, 160 based on the number of actuation cycles, the determined brake fluid volume, an elapsed time, a number of valve cycles, etc. The bleed controller 112 additionally generates alerts to prompt an operator to fill the reservoir 114 with additional brake fluid based on the volume of the reservoir, the number of actuation cycles, the determined brake fluid volume, and/or a low brake fluid level sensed by the third sensor 174. The bleed controller 112 may intermittently cease and/or abort operating the pump 118 to release brake fluid via the first, second, third, and fourth bleed screws 154, 156, 158, 160 based on when the number of actuation cycles of the pump 118 exceeds a count threshold, when the volume of circulated brake fluid exceeds a volume threshold, an elapsed time, and/or a low brake fluid level sensed by the third sensor 174. In other words, the bleed controller 112 monitors the pump 118, the first sensor 120, the second sensor 121, the third sensor 174, the fourth sensor, and the valves 142, 144, 146, 148, 150, 152, 153 to ensure a complete bleed of the hydraulic braking system 110.

Figure 5:
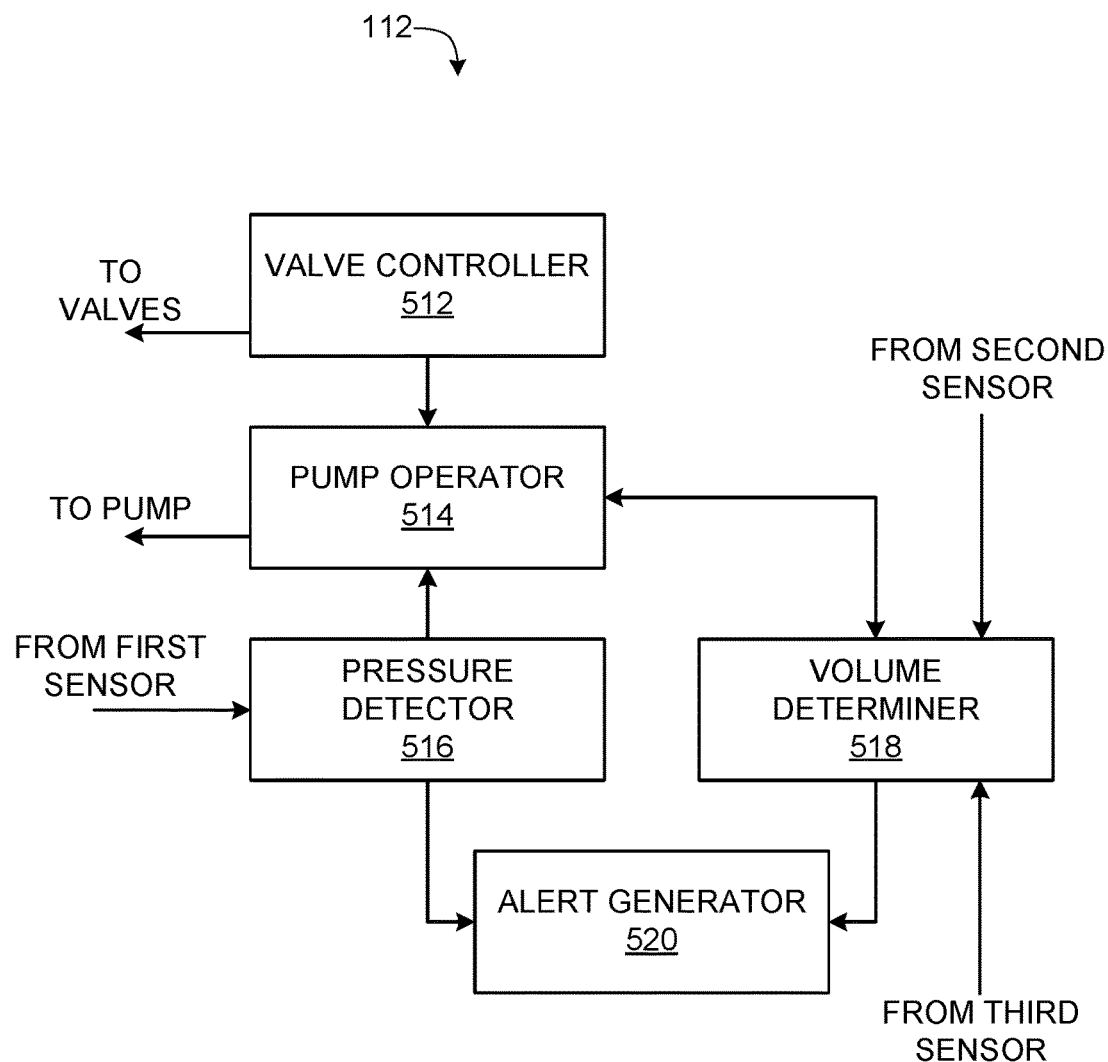
FIG. 5 is a block diagram of the example bleed controller of FIGS. 1-4.

FIG. 5 is a block diagram of the example bleed controller 112 of FIGS. 1-4. In the illustrated example of FIG. 5, the bleed controller 112 includes an example valve controller 512, a pump operator 514, a pressure detector 516, a volume determiner 518, and an alert generator 520. The valve controller 512 is in communication with the pump operator 514. The pump operator 514 is in communication with the pressure detector 516 and with the volume determiner 518. The alert generator 520 is in communication with the pressure detector 516 and with the volume determiner 518.

The valve controller 512 sends actuation commands to selectively open and close the first, second, third, fourth, fifth, sixth, and seventh valves 142, 144, 146, 148, 150, 152, 153 of FIG. 1. The valve controller 512 provides a valve status (e.g., "ready," "valves configured," etc.) to the pump operator 514.

The pump operator 514 operates the pump 118 of FIG. 1 based on the valve status, a request from an operator, and/or a brake fluid level status. In some examples, the pump operator 514 counts the number of actuation cycles of the pump 118 of FIG. 1 and sends the number of actuation cycles to the volume determiner 518. In some such examples, the volume determiner 518 determines a volume of pumped brake fluid based on the number of actuation cycles and the internal volume of the pump 118 of FIG. 1. In some examples, the volume determiner 518 receives a volume measurement of pumped brake fluid from the second sensor 121 of FIG. 1.

The volume determiner 518 receives a low brake fluid level warning signal from the third sensor 174 of FIG. 1 corresponding to a reserve volume of brake fluid in the reservoir 114 of FIG. 1. The volume determiner 518 sends the low brake fluid level warning signal to the alert generator 520. The volume determiner 518 determines whether the brake fluid level meets or exceeds a low fluid limit based on the warning signal from the third sensor 174. The volume determiner 518 sends a brake fluid level status (e.g., OK, not OK, etc.) to the pump operator 514 based on the low brake fluid level warning signal.

The volume determiner 518 determines whether the volume of pumped brake fluid exceeds a volume threshold (e.g., a reservoir volume, a near-empty reservoir volume, the reserve volume, a master cylinder circulation bleed volume, a brake line bleed volume, a total bleed volume, etc.). In some examples, because the volume of pumped brake fluid is directly related to the internal volume of the pump 118, the volume determiner 518 may determine whether the number of actuation cycles of the pump 118 exceeds a count threshold (e.g., the number of actuation cycles that yield a reservoir volume, a near-empty reservoir volume, a master cylinder circulation bleed volume, a brake line bleed volume, a total bleed volume, etc.). When the volume determiner 518 determines that the volume of pumped brake fluid exceeds the threshold and/or receives the low fluid level warning, the volume determiner 518 sends a stop command to the pump operator 514. The pump operator 514 ceases operating the pump 118 of FIG. 1 based on the stop command. When the volume determiner 518 determines that the volume of pumped brake fluid exceeds the threshold, the volume determiner 518 sends a volume threshold excess determination to the alert generator 520.

The pressure detector 516 detects the internal brake fluid pressure of the hydraulic braking system 110 of FIG. 1 via the first sensor 120 of FIG. 1. The pressure detector 516 determines whether the brake fluid pressure is within a target pressure range (e.g., whether the brake fluid pressure is between upper and lower thresholds). When the pressure detector 516 determines that the brake fluid pressure is not with the target pressure range, the pressure detector 516 sends a stop command to the pump operator 514. The pump operator 514 ceases operating the pump 118 of FIG. 1 based on the stop command. When the pressure detector 516 determines that the brake fluid pressure is not within the target pressure range, the pressure detector 516 sends a pressure fault determination to the alert generator 520.

The alert generator 520 generates an alert (e.g., to prompt and/or warn an operator, to indicate a successful bleed procedure completion, etc.) based on the threshold excess determination, the brake fluid level warning signal, and/or the pressure fault determination.

While an example manner of implementing the bleed controller 112 of FIGS. 1-4 is illustrated in FIG. 5, one or more of the elements, processes and/or devices illustrated in FIG. 5 may be combined, divided, re-arranged, omitted, eliminated and/or implemented in any other way. Further, the example valve controller 512, the example pump operator 514, the example pressure detector 516, the example volume determiner 518, the example alert generator 520 and/or, more generally, the example bleed controller 112 of FIGS. 1-4 may be implemented by hardware, software, firmware and/or any combination of hardware, software and/or firmware. Thus, for example, any of the example valve controller 512, the example pump operator 514, the example pressure detector 516, the example volume determiner 518, the example alert generator 520 and/or, more generally, the example bleed controller 112 of FIGS. 1-4 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, valve controller 512, the example pump operator 514, the example pressure detector 516, the example volume determiner 518, and/or the example alert generator 520 is/are hereby expressly defined to include a tangible computer readable storage device or storage disk such as a memory, a digital versatile disk (DVD), a compact disk (CD), a Blu-ray disk, etc. storing the software and/or firmware. Further still, the example bleed controller 112 of FIGS. 1-4 may include one or more elements, processes and/or devices in addition to, or instead of, those illustrated in FIG. 5, and/or may include more than one of any or all of the illustrated elements, processes and devices.

Figure 6:
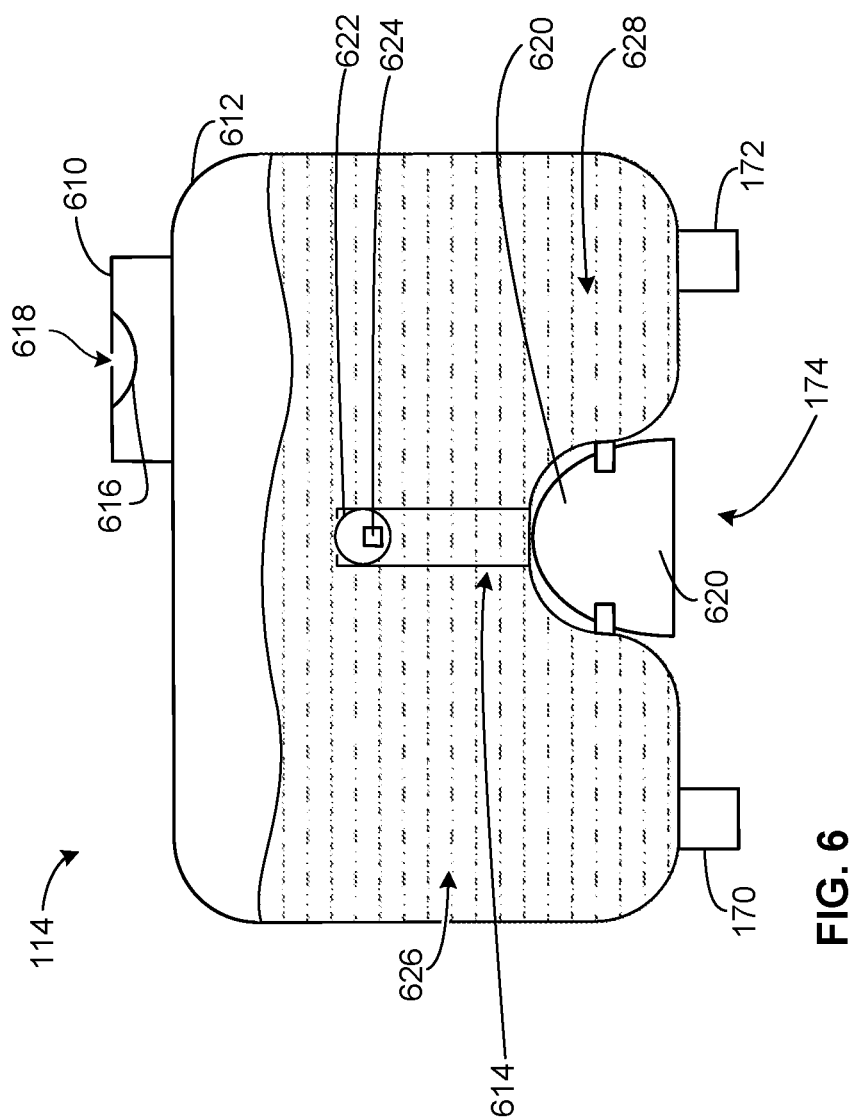
FIG. 6 is a cross-sectional view of an example implementation of the reservoir of FIG. 1.

FIG. 6 is a cross-sectional view of an example implementation of the reservoir 114 of FIG. 1. In the illustrated example of FIG. 6, the reservoir 114 includes the fifth and sixth ports 170, 172, the third sensor 174 a cap 610, an outer wall 612, and an internal baffle 614. The internal baffle 614 includes at least one opening (not pictured in FIG. 6). The cap 610 includes a diaphragm 616 and a relief hole 618. The third sensor 174 includes a switch 620 and a float 622. The float 622 includes a magnet 624. The outer wall 612 supports the switch 620, the internal baffle 614 and the cap 610. The internal baffle 614 supports the float 622.

Under normal operation, if brake fluid 626 is lost from the hydraulic braking system 110 (e.g., via a leak), a brake fluid level in the reservoir 114 decreases. As the brake fluid level decreases, brake fluid 626 flows out of the internal baffle 614 via the opening and the float 622 moves toward the switch 620. When the float 622 is near the switch 620, the magnet 624 activates the switch 620 to generate a low brake fluid level warning. In some examples, a reserve volume 628 of brake fluid 626 remains in the reservoir 114 when the low brake fluid level warning is produced.

In operation, in bleed mode, brake fluid 626 enters the reservoir 114 from the master cylinder 116 of FIG. 1 via the fifth port 170. In operation, in bleed mode, brake fluid 626 exits the reservoir 114 to the pump 118 via the sixth port 172. As brake fluid 626 circulates through the reservoir 114, the brake fluid 626 flows around the internal baffle 614. Thus, the internal baffle 614 increases a fluid path length and slows the travel of the brake fluid 626 through the reservoir 114. By increasing the fluid path length of the brake fluid 626 through the reservoir 114, air entrained in the brake fluid 626 may float out of the brake fluid 626 before the brake fluid 626 exits the reservoir 114 via the sixth port 172. The diaphragm 616 deflects to push atmospheric air out of the relief hole 618 to accept the added volume of the risen air in the reservoir 114.

Flowcharts representative of example methods for implementing the bleed controller 112 of FIGS. 1-5 are shown in FIGS. 7-11. In this example, the methods may be implemented using machine readable instructions that comprise a program for execution by a processor such as the processor 1212 shown in the example processor platform 1200 discussed below in connection with FIG. 12. The program may be embodied in software stored on a tangible computer readable storage medium such as a CD-ROM, a floppy disk, a hard drive, a digital versatile disk (DVD), a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowcharts illustrated in FIGS. 7-11, many other methods of implementing the example bleed controller 112 may alternatively be used. For example, the order of execution of the blocks may be changed, and/or some of the blocks described may be changed, eliminated, or combined.

As mentioned above, the example processes of FIGS. 7-11 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 7-11 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 7:
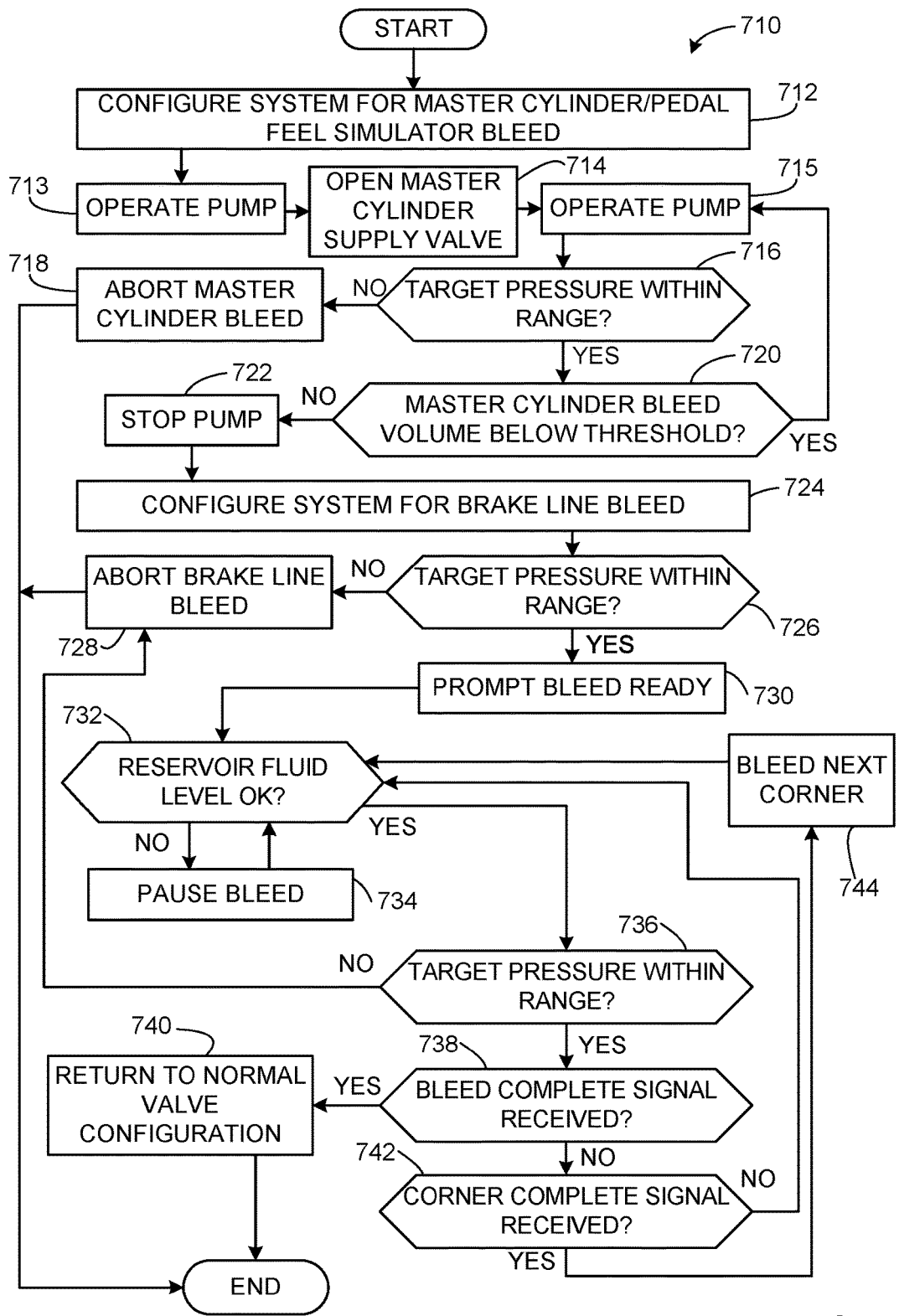
FIG. 7 is a flowchart representative of an example method that may be performed to implement the example bleed controller of FIGS. 1-5.

FIG. 7 is a flowchart representative of an example method that may be performed to implement the example bleed controller of FIGS. 1-4. The example method 710 may be performed, for example, to perform a brake bleed procedure.

To start, at block 712, the valve controller 512 actuates the valves of the hydraulic braking system 110 to bleed the pedal feel simulator 115 and the master cylinder 116.

Then, at block 713, the pump operator 514 operates the pump 118. In some examples, at block 713, the pump operator 514 operates the pump according to a sinusoidal pulse pattern.

Then, at block 714, the valve controller 512 actuates the valves of the hydraulic braking system 110 to open the seventh valve 153 on the master cylinder fluid supply line 134.

Then, at block 715, the pump operator 514 operates the pump 118.

Next, at block 716, the pressure detector 516 determines whether the internal pressure of the hydraulic braking system 110 is within a predetermined target range (e.g., the pressure is within upper and lower thresholds).

If, at block 716, the pressure detector 516 determines that the internal pressure of the hydraulic braking system is not within the predetermined target range (e.g., brake fluid pressure in the hydraulic braking system 110 approaches and/or exceeds a maximum design pressure of the hydraulic braking system 110 or brake fluid pressure in the hydraulic braking system 110 is abnormally low), the method 710 proceeds to block 718, where the bleed controller 112 aborts bleeding the master cylinder 116 and the method 710 ends.

If, at block 716, the pressure detector 516 determines that the internal pressure of the hydraulic braking system 110 is within the predetermined target pressure range, the method 710 proceeds to block 720, where the volume determiner 518 determines whether a master cylinder bleed volume is below a threshold (e.g., whether a master cylinder bleed volume of brake fluid has been pumped).

If, at block 720, the volume determiner 518 determines that the master cylinder bleed volume is below the threshold, the method 710 returns to block 714.

If, at block 720, the volume determiner 518 determines that a master cylinder bleed volume meets or exceeds the threshold, the method 710 proceeds to block 722, where the pump operator 514 stops the pump 118.

Next, at block 724, the valve controller 512 actuates the valves of the hydraulic braking system 110 to bleed one or more of the brake lines.

Then, at block 726, the pressure detector 516 determines whether the internal pressure of the hydraulic braking system 110 is within the predetermined target range.

If, at block 726, the pressure detector 516 determines that the internal pressure of the hydraulic braking system is not within the predetermined target range, the method 710 proceeds to block 728, where the bleed controller 112 aborts bleeding the master cylinder 116 and the method 710 ends.

If, at block 726, the pressure detector 516 determines that the internal pressure of the hydraulic braking system 110 is within the predetermined target pressure range, the method 710 proceeds to block 730.

At block 730, the alert generator 520 generates an alert to prompt an operator (e.g., an automotive technician) to open a bleed screw at a vehicle corner (e.g., left front, left rear, right front, right rear). In some examples, at block 730, the alert generator 520 generates an alert to prompt the operator to open the bleed screw at a specific corner. In some examples, at block 730, in response to the prompt alert, the operator enters a corner identifier into the bleed controller 112 indicating which vehicle corner is to be bled. In some such examples, at block 730, the valve controller 512 adjusts (e.g., opens and/or closes) one or more of the brake line valves 142, 146, 148, 150 based on the corner identifier.

Next, at block 732, the volume determiner 518 determines whether a reservoir fluid level meets or exceeds a fluid level threshold.

If, at block 732, the volume determiner 518 determines that the reservoir level does not meet the fluid level threshold (e.g., the reservoir level is below the threshold), the method 710 proceeds to block 734.

At block 734, the pump operator 514 stops the pump 118 and the alert generator 520 indicates a low fluid warning to pause bleeding of the vehicle corner. Control of the method 710 then returns to block 732.

If, at block 732, the volume determiner 518 determines that the reservoir fluid level meets or exceeds the fluid level threshold, the method 710 proceeds to block 736.

At block 736, the pressure detector 516 determines again whether the internal pressure of the hydraulic braking system 110 within the target pressure range.

If, at block 736, the pressure detector 516 determines that the internal pressure of the hydraulic braking system 110 is not within the target pressure range, the method 710 returns to block 728, where the bleed controller 112 aborts bleeding the brake line and the method 710 ends.

If, at block 736, the pressure detector 516 determines that the internal pressure of the hydraulic braking system 110 is within the target pressure range, the method 710 proceeds to block 738.

Then, at block 738, the bleed controller 112 determines whether a bleed complete signal (e.g., indicating that the bleeding maintenance desired has been accomplished) has been received from the operator.

If, at block 738, the bleed controller 112 determines that a bleed complete signal has not been received, the method 710 proceeds to block 740.

If, at block 738, the bleed controller 112 determines that a bleed complete signal reserve has been received, the method 710 proceeds to block 740.

Then, at block 740, the bleed controller 112 returns the hydraulic braking system 110 to a braking configuration for normal driving configuration (e.g., the valve controller 512 opens and/or closes the valves 142, 144, 146, 148, 150, 152, 153 and the pump operator 514 stops the pump 118). The method 710 then ends.

Next, at block 742, the bleed controller 112 determines whether a corner complete signal (e.g., indicating that bleeding maintenance of the vehicle corner being bled has been accomplished) has been received from the operator. In some examples, the corner complete signal includes an identifier of the completed corner.

If, at block 742, the bleed controller 112 determines that a corner complete signal has not been received, the method 710 returns to block 732.

If, at block 742, the bleed controller 112 determines that a corner complete signal has been received, the method 710 proceeds to block 744.

Then, at block 744, the bleed controller 112 bleeds a next vehicle corner. In some examples, at block 744, the valve controller 512 adjusts one or more of the brake line valves 142, 146, 148, 150 to bleed the next corner. In some examples, at block 744, the alert generator 520 generates an indication for the operator to close the bleed screw on the completed corner and/or to direct the operator to the next corner. In some such examples, at block 744, the indication identifies the next corner. In some examples, at block 744, the operator enters a corner identifier into the bleed controller 112 indicating which vehicle corner is to be bled next. In some such examples, at block 744, the valve controller 512 adjusts one or more of the brake line valves 142, 146, 148, 150 based on the corner identifier. Then, the method 710 returns to block 732.

Figure 8:
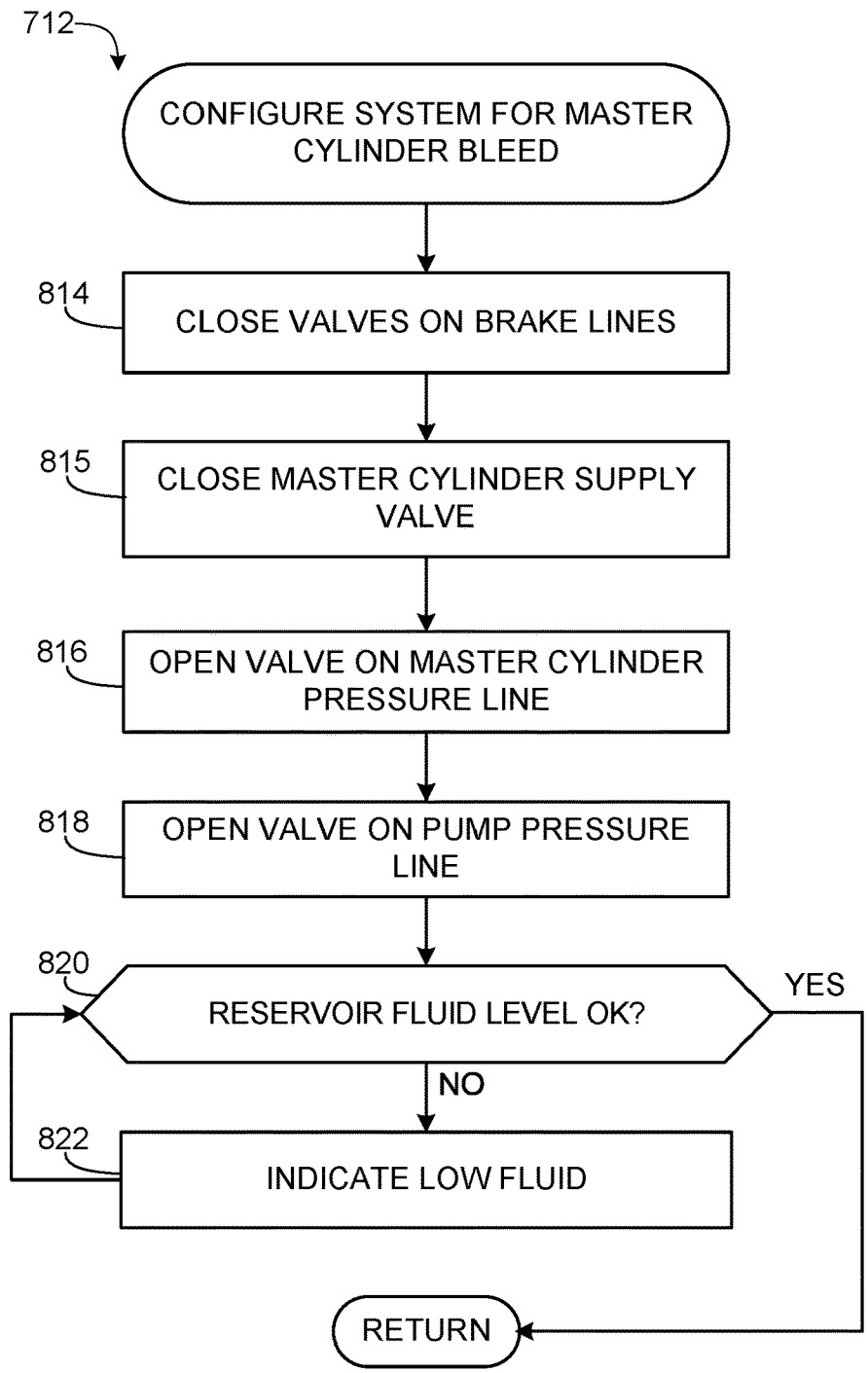
FIG. 8 is a flowchart representative of an example method that may be performed to implement block 712 of the example method of FIG. 7.

FIG. 8 is a flowchart representative of an example method that may be performed to implement block 712 of the example method of FIG. 7. To actuate the valves of the hydraulic braking system 110 to bleed the master cylinder, at block 814, the example valve controller 512 of FIG. 5 closes the example first, third, fourth, and fifth valves 142, 146, 148, 150 respectively located on the example first, third, fourth, and second brake lines 122, 126, 128, 126.

Then, at block 815, the example valve controller 512 closes the seventh valve 153 located on the master cylinder fluid supply line 134

Then, at block 816, the example valve controller 512 opens the second valve 144 located on the master cylinder pressure line 138.

Next, at block 818, the example valve controller 512 opens the sixth valve 152 on the pump pressure line 136.

Further, at block 820, the volume determiner 518 determines whether the reservoir level meets or exceeds a fluid level threshold.

If, at block 820, the volume determiner 518 determines that the reservoir level does not meet the fluid level threshold, the method 712 proceeds to block 822.

At block 822, the alert generator 520 indicates a low fluid warning to alert the operator of insufficient fluid in the reservoir 114. Control of the method 712 then returns to block 820.

If, at block 820, the volume determiner 518 determines that the reservoir level meets or exceeds the fluid level threshold limit, the method 712 of FIG. 8 ends and control returns to block 713 of FIG. 7.

Figure 9:
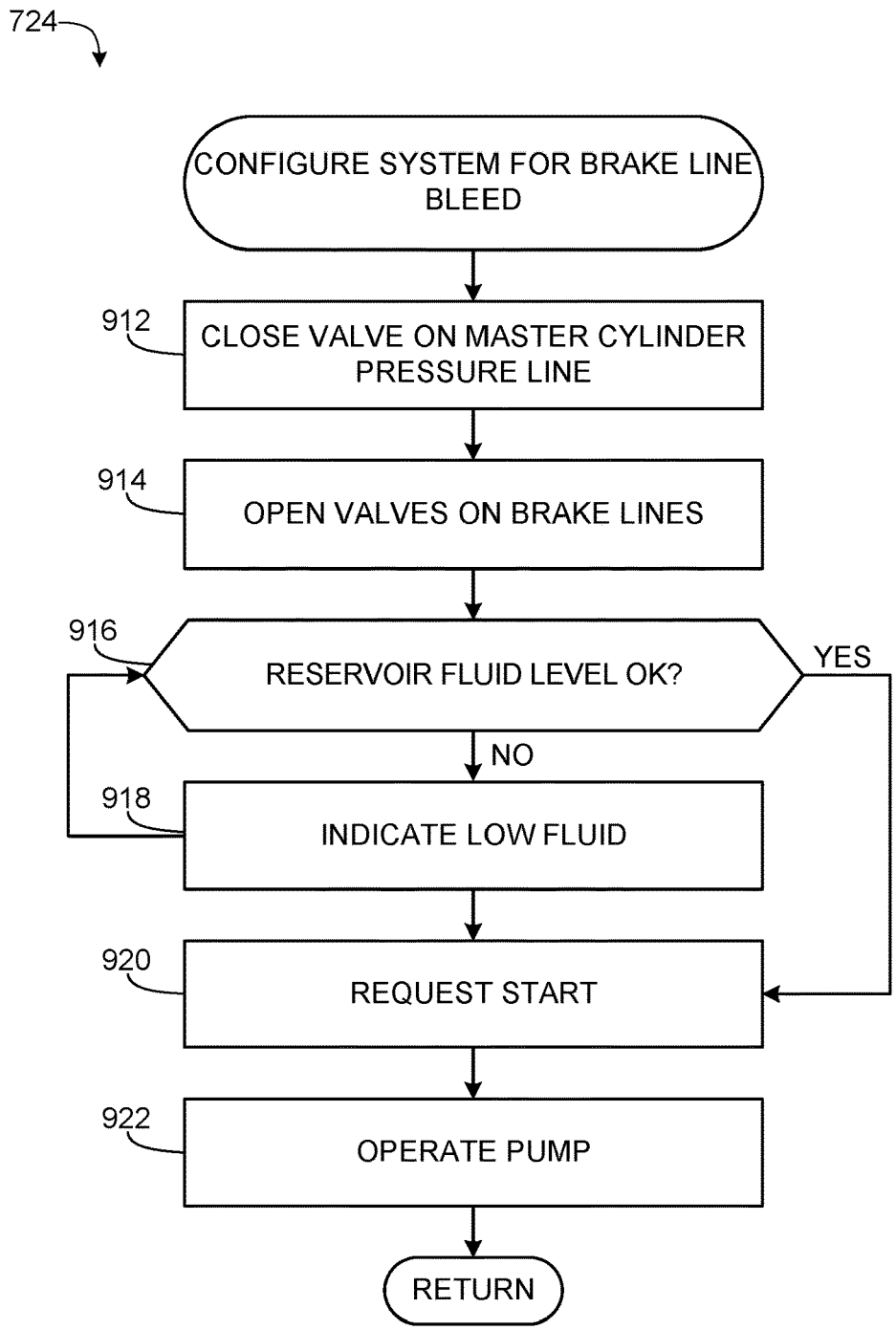
FIG. 9 is a flowchart representative of an example method that may be performed to implement block 724 of the example method of FIG. 7.

FIG. 9 is a flowchart representative of an example method that may be performed to implement block 724 of the example method of FIG. 7. To actuate the valves of the hydraulic braking system 110 to bleed one or more of the brake lines, at block 912, the example valve controller 512 of FIG. 5 closes the example second valve 144 located on the master cylinder pressure line 138.

Then, at block 914, the example valve controller 512 opens the example first, third, fourth, and fifth valves 142, 146, 148, 150 respectively located on the example first, third, fourth, and second brake lines 122, 126, 128, 124.

Further, at block 916, the volume determiner 518 determines whether the reservoir level meets or exceeds a fluid level threshold.

If, at block 916, the volume determiner 518 determines that the reservoir level does not meet the fluid level threshold, the method 724 proceeds to block 918.

At block 918, the alert generator 520 indicates a low fluid warning to alert the operator of insufficient fluid in the reservoir 114. Control of the method 724 then returns to block 916.

If, at block 916, the volume determiner 518 determines that the reservoir level meets or exceeds the fluid level threshold, the method 724 proceeds to block 920.

Next, at block 920, the example alert generator 520 generates a request for an operator to enter a pump start command into the bleed controller 112. In some examples, the request indicates that the bleed controller 112 is ready to bleed one or more of the brake lines.

Then, at block 922, the pump operator 514 operates the pump 118 based on the pump start command. The method 724 of FIG. 9 ends and control returns to block 726 of FIG. 7.

Figure 10:
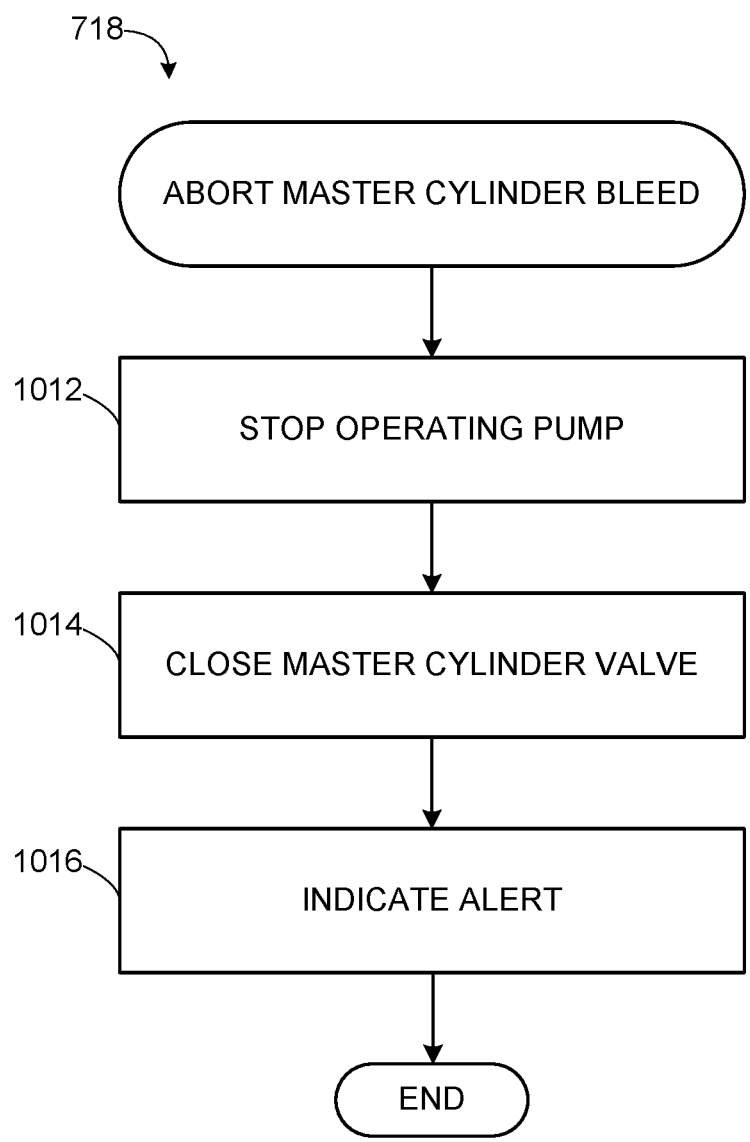
FIG. 10 is a flowchart representative of an example method that may be performed to implement block 718 of the example method of FIG. 7.

FIG. 10 is a flowchart representative of an example method that may be performed to implement block 718 of the example method of FIG. 7. To abort bleeding the master cylinder 116, at block 1012, the example pump operator 514 of FIG. 5 stops operating the pump 118.

Then, at block 1014, the example valve controller 512 of FIG. 5 closes the second valve 144 located on the master cylinder pressure line 138.

Next, at block 1016, the alert generator 520 indicates an alert to warn an operator that the master cylinder bleed has failed. The method 718 of FIG. 10 and the method 710 of FIG. 7 then end.

Figure 11:
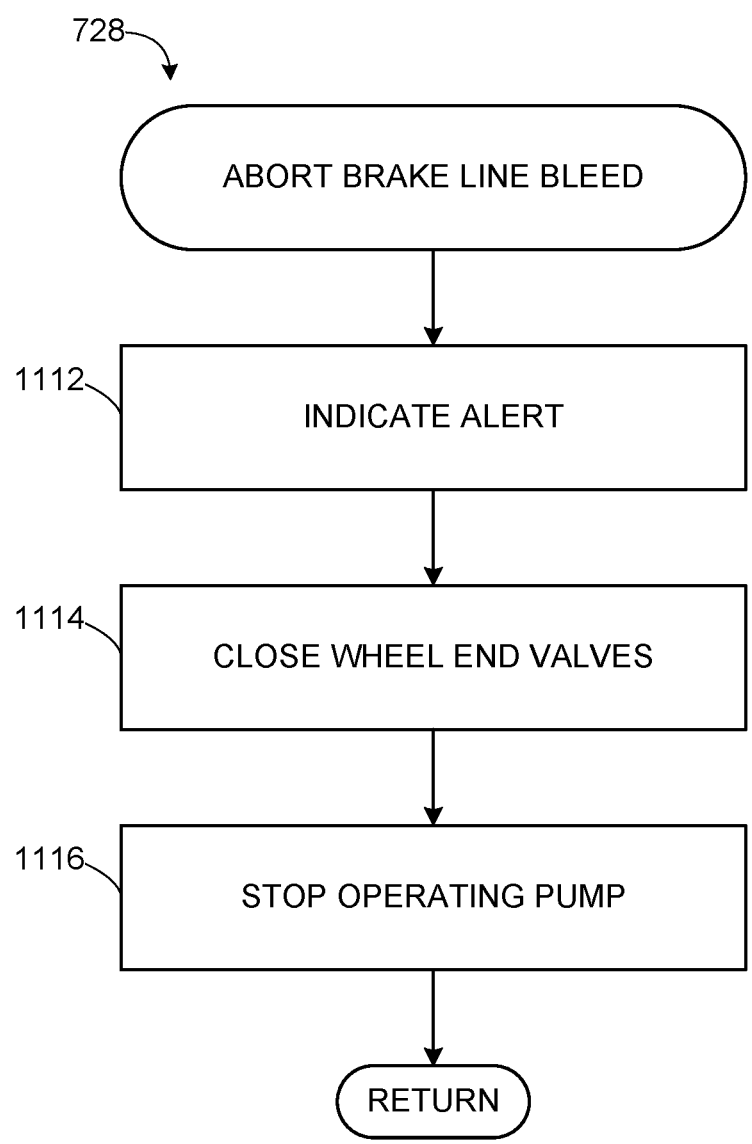
FIG. 11 is a flowchart representative of an example method that may be performed to implement block 728 of the example method of FIG. 7.

FIG. 11 is a flowchart representative of an example method that may be performed to implement block 728 of the example method of FIG. 7. To abort bleeding the one or more brake lines, at block 1112, the alert generator 520 indicates an alert to warn an operator that the brake line bleed has failed.

Then, at block 1114, the example valve controller 512 of FIG. 5 closes the example first, third, fourth, and fifth valves 142, 146, 148, 150 respectively located on the example first, third, fourth, and second brake lines 122, 124, 126, 128.

Next, at block 1116, the example pump operator 514 of FIG. 5 stops operating the pump 118. The method 728 of FIG. 11 and the method 710 of FIG. 7 then end.

Figure 12:
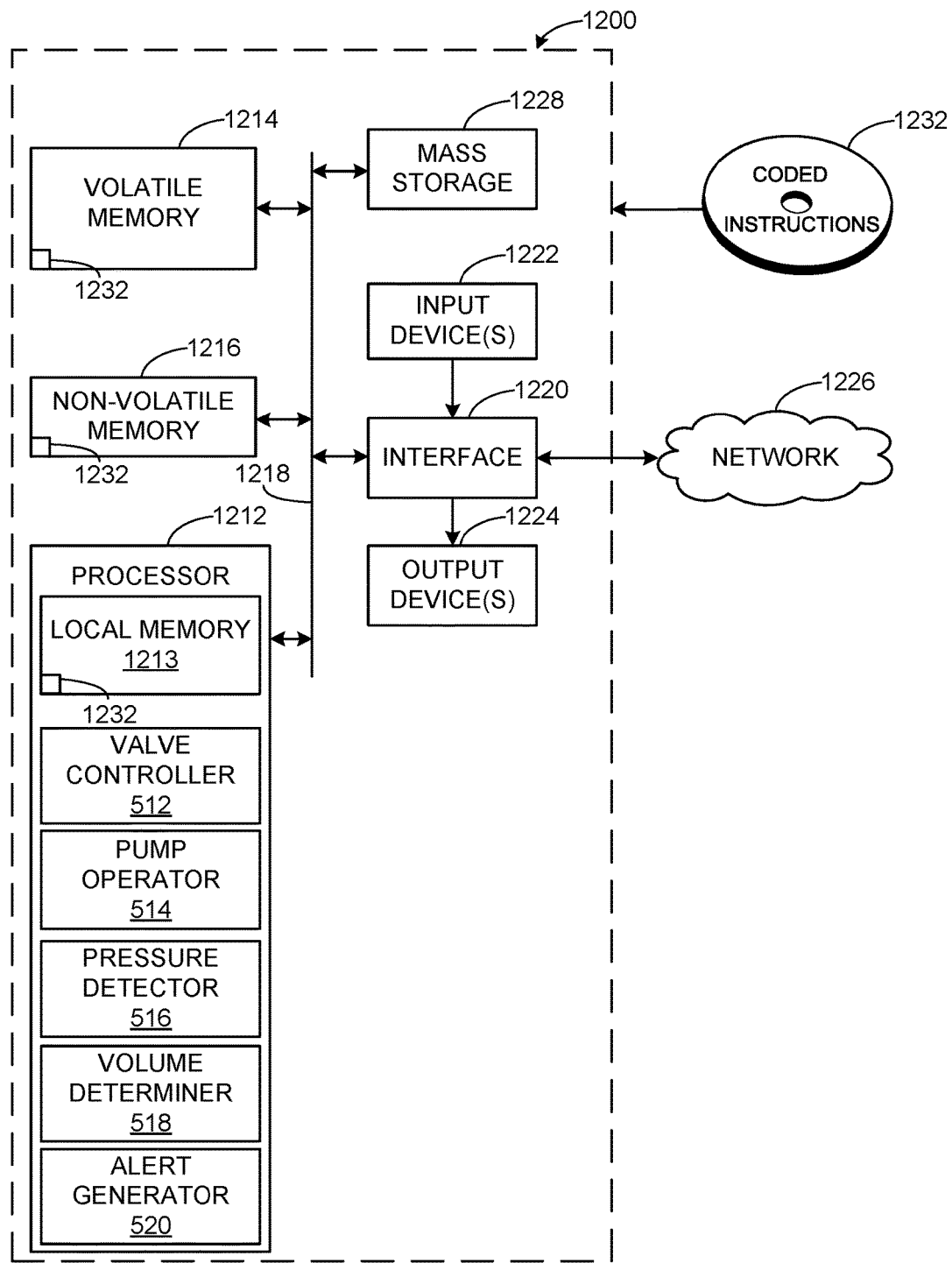
FIG. 12 is a block diagram of an example processor platform capable of executing instructions to implement the methods of FIGS. 6, 7, 8, 9, 10 and/or 11 to implement the example bleed controller of FIGS. 1, 2, 3, 4 and/or 5.

FIG. 12 is a block diagram of an example processor platform 1200 capable of executing instructions to implement the methods of FIGS. 7-11 and the bleed controller 112 of FIGS. 1, 2, 3, 4 and/or 5. The processor platform 1200 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device(s) 1222 permit(s) a user to enter data and commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives.

Coded instructions 1232 to implement the methods of FIGS. 6-10 may be stored in the mass storage device 1228, in the volatile memory 1214, in the non-volatile memory 1216, and/or on a removable tangible computer readable storage medium such as a CD or DVD.

From the foregoing, it will be appreciated that the above disclosed methods, apparatus and articles of manufacture may aid in bleeding a hydraulic braking system. By configuring valves to circulate brake fluid from a reservoir through a master cylinder while keeping the hydraulic braking system closed, brake fluid loss and/or waste, associated disposal costs, and potential damage to painted surfaces caused by brake fluid are avoided. Further, by measuring a volume of brake fluid released via brake assembly bleed screws, brake fluid bleeding and/or flushing procedures may be objectively ceased to minimize brake fluid loss and/or waste and associated disposal costs. Additionally, by configuring valves and pumping brake fluid through a hydraulic braking system using components already present in the hydraulic braking system, external equipment needed to perform brake bleeding is minimized. Moreover, using components already present in the hydraulic braking system in combination with operator prompts may make brake bleeding more efficient and thus reduce associated costs.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
 a bleed controller to:
  actuate a first valve between a first closed position and a first open position, the first valve connected to and operatively positioned between a pump and an end of a brake line, the pump connected to a reservoir;
  actuate a second valve between a second closed position and a second open position, the second valve connected to and operatively positioned between the pump and a master cylinder, the master cylinder connected to the reservoir;
  actuate a third valve between a third closed position and a third open position, the third valve connected to and operatively positioned between the master cylinder and the reservoir;
  operate the pump to:
   bleed the brake line when the first valve is actuated to the first open position and the second valve is actuated to the second closed position; and
   bleed the master cylinder when the first valve is actuated to the first closed position, the second valve is actuated to the second open position, and the third valve is actuated to the third open position; and cease the operating of the pump when a fluid level in the reservoir is below a threshold.

2. The apparatus of claim 1, wherein the bleed controller is further to detect an internal pressure of a braking system measured via a sensor connected to the pump.

3. The apparatus of claim 2, wherein the bleed controller is further to cease the operating of the pump when the pressure exceeds a pressure threshold.

4. The apparatus of claim 1, wherein the bleed controller is further to determine a volume of fluid pumped by the pump based on a volume measurement from a sensor connected to the pump, or based on a number of actuation cycles and an internal volume of the pump.

5. The apparatus of claim 4, wherein the bleed controller is further to cease the operating of the pump when the volume exceeds a volume threshold.

6. The apparatus of claim 1, wherein the bleed controller is further to generate an alert to indicate that bleeding of at least one of the master cylinder or the brake line is complete.

7. The apparatus of claim 1, wherein the bleed controller is further to:
determine a fluid pressure in a fluid line operatively positioned between the pump and the first and second valves, the fluid pressure detected by a first sensor coupled to a fluid line;
determine a fluid flow through the fluid line, the fluid flow detected by a second sensor coupled to the fluid line;
determine a fluid level in the reservoir, the fluid level detected by a third sensor coupled to the reservoir;
monitor the fluid pressure, the fluid flow, and the fluid level while operating the pump to bleed the brake line.

8. A method comprising:
actuating a first valve between a first closed position and a first open position, the first valve connected to and operatively positioned between a pump and an end of a brake line, the pump connected to a reservoir;
actuating a second valve between a second closed position and a second open position, the second valve connected to and operatively positioned between the pump and a master cylinder, the master cylinder connected to the reservoir;
actuating a third valve between a third closed position and a third open position, the third valve connected to and operatively positioned between the master cylinder and the reservoir;
operating the pump to:
bleed the brake line when the first valve is actuated to the first open position and the second valve is actuated to the third closed position; and
bleed the master cylinder when the first valve is actuated to the first closed position, the second valve is actuated to the second open position, and the third valve is actuated to the third open position; and
ceasing the operating of the pump when a fluid level in the reservoir is below a threshold.

9. The method of claim 8, further including detecting an internal pressure of a braking system measured via a sensor connected to the pump.

10. The method of claim 9, further including ceasing the operating of the pump when the pressure exceeds a pressure threshold.

11. The method of claim 8, further including determining a volume of fluid pumped by the pump based on a volume measurement from a sensor connected to the pump, or based on a number of actuation cycles and an internal volume of the pump.

12. The method of claim 11, further comprising ceasing the operating of the pump when the volume of fluid exceeds a volume threshold.

13. The method of claim 8, further including generating an alert to indicate that bleeding of at least one of the master cylinder or the brake line is complete.

14. The method of claim 8, further including:
determining a fluid pressure in a fluid line operatively positioned between the pump and the first and second valves, the fluid pressure detected by a first sensor coupled to a fluid line;
determining a fluid flow through the fluid line, the fluid flow detected by a second sensor coupled to the fluid line;
determining a fluid level in the reservoir, the fluid level detected by a third sensor coupled to the reservoir;
monitoring the fluid pressure, the fluid flow, and the fluid level while operating the pump to bleed the brake line.

15. A tangible computer readable storage medium comprising instructions that, when executed, cause a processor to at least:
actuate a first valve between a first closed position and a first open position, the first valve connected to and operatively positioned between a pump and an end of a brake line, the pump connected to a reservoir;
actuate a second valve between a second closed position and a second open position, the second valve connected to and operatively positioned between the pump and a master cylinder, the master cylinder connected to the reservoir;
actuate a third valve between a third closed position and a third open position, the third valve connected to and operatively positioned between the master cylinder and the reservoir;
operate the pump to:
bleed the brake line when the first valve is actuated to the first open position and the second valve is actuated to the second closed position; and
bleed the master cylinder when the first valve is actuated to the first closed position, the second valve is actuated to the second open position, and the third valve is actuated to the third open position; and
cease the operating of the pump when a fluid level in the reservoir is below a threshold.

16. The tangible computer readable storage medium of claim 15, wherein the instructions, when executed, further cause the processor to detect an internal pressure of a braking system measured via a sensor connected to the pump.

17. The tangible computer readable storage medium of claim 16, wherein the instructions, when executed, further cause the processor to cease the operating of the pump when the pressure exceeds a pressure threshold.

18. The tangible computer readable storage medium of claim 15, wherein the instructions, when executed, further cause the processor to determine a volume of fluid pumped by the pump based on a volume measurement from a sensor connected to the pump, or based on a number of actuation cycles and an internal volume of the pump.

19. The tangible computer readable storage medium of claim 18, wherein the instructions, when executed, further cause the processor to cease the operating of the pump when the volume of fluid exceeds a volume threshold.

20. The tangible computer readable storage medium of claim 15, wherein the instructions, when executed, further cause the processor to generate an alert to indicate that bleeding of at least one of the master cylinder or the brake line is complete.

21. The tangible computer readable storage medium of claim 15, wherein the instructions, when executed, further cause the processor to:
- determine a fluid pressure in a fluid line operatively positioned between the pump and the first and second valves, the fluid pressure detected by a first sensor coupled to a fluid line;
- determine a fluid flow through the fluid line, the fluid flow detected by a second sensor coupled to the fluid line;
- determine a fluid level in the reservoir, the fluid level detected by a third sensor coupled to the reservoir;
- monitor the fluid pressure, the fluid flow, and the fluid level while operating the pump to bleed the brake line.

* * * * *